UNITED STATES PATENT OFFICE.

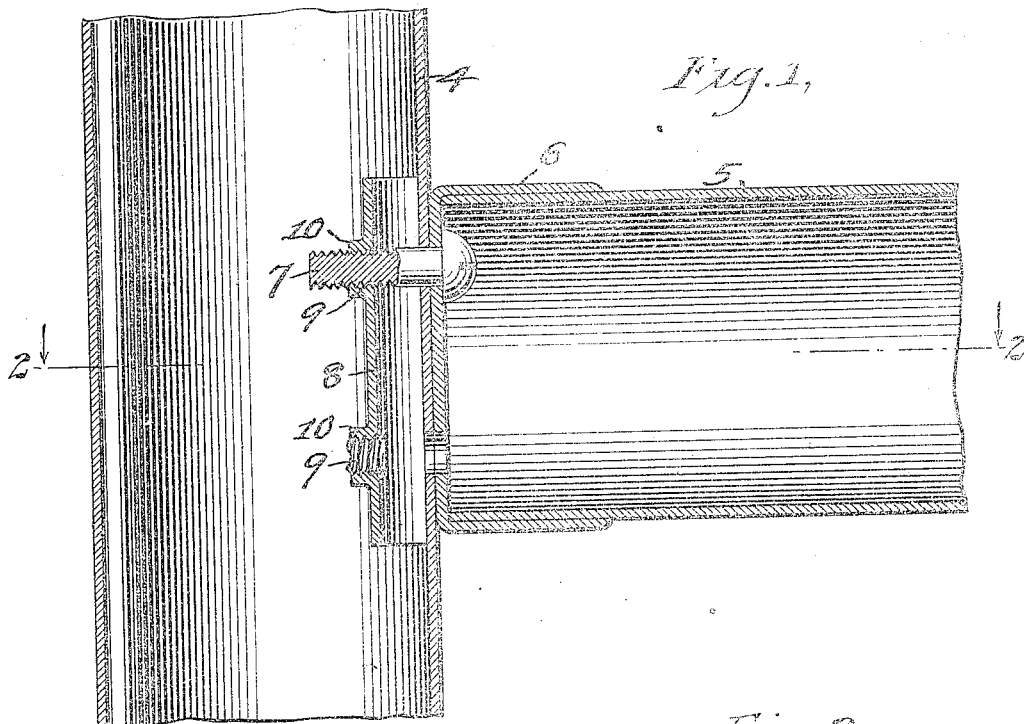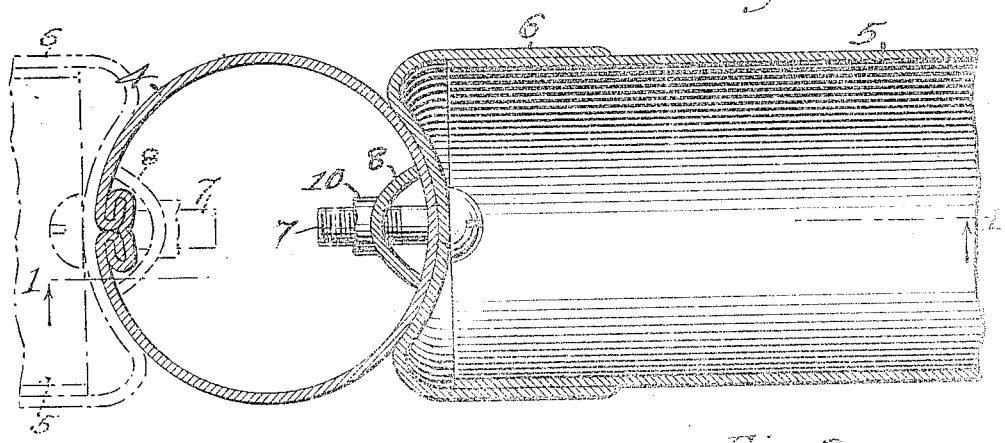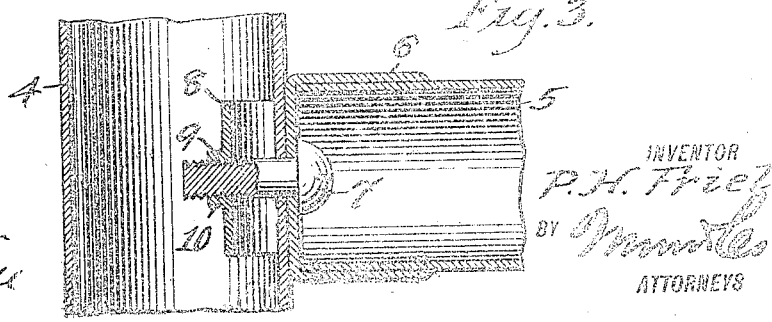

PATRICK HENRY FRIEL, OF KENOSHA, WISCONSIN.

BEDSTEAD CONSTRUCTION.

1,213,473.	Specification of Letters Patent.	Patented Jan. 23, 1917.

Application filed November 5, 1915. Serial No. 59,764.

*To all whom it may concern:*

Be it known that I, PATRICK H. FRIEL, a citizen of the United States, and a resident of Kenosha, in the county of Kenosha and State of Wisconsin, have invented certain new and useful Improvements in Bedstead Construction, of which the following is a specification.

My invention relates to the construction of metal beds, particularly those made of metal tubes of relatively light weight, and the main object thereof is to provide means for connecting the tubes in a rigid manner, for either drawn or rolled tubes, and which, in the latter type of tubes, renders the tube itself rigid against torsional movement.

My invention is fully described in the following specification, of which the accompanying drawings form a part, in which like characters refer to like parts in each of the views, and in which:—

Figure 1 is a section taken through two connected tubes employing my invention, on the line 1—1 of Fig. 2; Fig. 2 is a section taken on the line 2—2 of Fig. 1; and Fig. 3 is a view similar to Fig. 1 but showing a modification thereof.

In the drawings forming a part of this application I have shown a tube 4 which it is desired to connect with a tube 5 through the medium of a ferrule 6 on the latter, said ferrule being grooved on its closed end to closely fit the curvature of the tube 4 and thus prevent movement of one with respect to the other.

The ferrule 6 and tube 4 are bored for the passage of one or more screws 7, one being shown in Fig. 3 and two in Fig. 1, passed from the ferrule into the tube 4 and engaged with a nut 8 of a peculiar design and which is the basis of this application for patent. This nut consists of a channeled strip of sheet metal having threaded bores 9 for the screws 7 formed in such manner as to leave a bur 10 on the upper surface of the nut around each bore, thereby permitting a relatively long screw thread in relatively thin metal, the nut being arranged with its grooved side toward the ferrule 6 and with its edges bearing on the inner surface of the tube 4 on each side of the screw or screws 7, as clearly shown in Fig. 2.

When the parts are assembled and the screws 7 tightened the nut hugs the inner wall of the tube 4 tightly and draws the ferrule 6 and tube 4 tightly together, thereby preventing any twisting movement of the ferrule on the tube 4 and constituting an airtight, invisible, joint.

Rolled tubes of the type shown in Fig. 2 allow of a degree of torsional movement because of the sliding of the joined edges over each other, but when my nut is used on the side of the tube having the edge joint, as indicated by dotted lines in Fig. 2, this torsional movement of the tube is prevented because of the relatively long bearing of the nut upon the inner surface of said tube, and my nut thus serves a dual purpose.

My invention may be used for joining tubes in uses other than beds, and the nuts may be conveyed into position in tubes of various lengths by means of a special conveyer not illustrated as it forms no part of this invention.

The sheet metal of which the nut is formed is more or less resilient, and when the screw 7 is tightened the span of the nut yields slightly and causes a binding effect between the threads on the screw and in the bore 9, thereby locking the screw against loosening, a fault common to many forms of joints now in use, and I may, as will be understood, make the nuts of any desired length according to the particular use being made thereof.

Having fully described my invention, what I claim as new, and desire to secure by Letters Patent, is:—

In a joint for connecting the end of one tube with the side of another tube, a ferrule on said first named tube having a closed end bearing on the side of said last named tube, a screw passed through said ferrule and into said last named tube having its head bearing against the inner surface of said closed end, and a nut for said screw within said last named tube consisting of a U-shaped strip of sheet metal having parallel edges bearing against the inner surface of said last named tube on opposite sides of said screw and having a threaded bore in the apex thereof for said screw, said bearing edges being adapted to separate by the tightening of said screw to bind the apex of said nut to said screw.

In testimony whereof I have signed my name to this specification in the presence of two subscribing witnesses.

PATRICK HENRY FRIEL.

Witnesses:
BENJ. M. DE DIEMAR,
FRED F. RIESE.